United States Patent [19]

Kawahara et al.

[11] Patent Number: 4,468,420
[45] Date of Patent: Aug. 28, 1984

[54] METHOD FOR MAKING A SILICON DIOXIDE COATING

[75] Inventors: Hideo Kawahara, Toyonaka; Hirotsugu Nagayama, Nishinomiya; Hisao Honda, Itami, all of Japan

[73] Assignee: Nippon Sheet Glass Co., Ltd., Japan

[21] Appl. No.: 538,289

[22] Filed: Oct. 3, 1983

[30] Foreign Application Priority Data

Jul. 14, 1983 [JP] Japan ................................ 58-128261
Jul. 27, 1983 [JP] Japan ................................ 58-137217

[51] Int. Cl.³ .......................... B05D 1/18; B05D 3/02
[52] U.S. Cl. ............................ 427/397.7; 106/287.34; 427/93; 427/95; 427/255; 427/402; 427/430.1; 428/427; 428/428; 428/446

[58] Field of Search ............... 427/397.7, 430.1, 376.2, 427/402, 85, 93, 95, 224, 225; 428/446, 427, 428; 106/287.34

[56] References Cited

U.S. PATENT DOCUMENTS 2,695,247 11/1954 Junge ..................................... 117/54

Primary Examiner—Michael R. Lusignan
Attorney, Agent, or Firm—McDougall, Hersh & Scott

[57] ABSTRACT

A method for making a silicon dioxide coating on a surface of a substrate such as, for example, an alkali metal-containing glass sheet by dipping the substrate in a treatment liquid obtained by adding boric acid to an aqueous silicon dioxide-saturated solution of hydrosilicofluoric acid.

12 Claims, 5 Drawing Figures

METHOD FOR MAKING A SILICON DIOXIDE COATING

BACKGROUND OF THE INVENTION

1. Field of the Invention

This invention relates to a method for making a silicon dioxide coating on a substrate made of glass, ceramics, a metal or an organic material.

2. Description of the Prior Art

It is widely carried out these days to coat the surfaces of various materials with silicon dioxide coatings. For example, it has been practiced for many years to reduce the reflection of a surface, e.g., a glass surface by applying an alternating multi-layered coating of titanium oxide films and silicon dioxide films on the surface. It is also practices extensively to form a silicon dioxide coating as a protecting film on the surface of a metal or alloy. Besides, when using an alkali metal-containing glass such as soda-lime glass or boro-silicate glass as liquid crystal display panel or solar battery substrate glass, the surface of such a glass is coated with silicon dioxide in order to avoid the elution of its alkali metal component or components. Prevention of the elution of alkali metal component or components from glass has become a technique particularly indispensable for the maintenance of service life of liquid crystal display devices or solar batteries. In addition, the insulative property of a silicon dioxide coating has recently been attracting engineers' and researchers' attention. There is an ever-increasing necessity to ensure insulation between conductive films in various electronic parts and devices, for example, by employing a structure of a conductive film/silicon dioxide film/conductive film.

A variety of techniques has heretofore been employed to make silicon dioxide coatings on glass surfaces, including the vacuum deposition, sputtering and CVD techniques. These conventional techniques are however accompanied by such drawbacks that the formation of silicon dioxide coatings is costly as these conventional techniques require expensive facilities and accessories and, besides, they can be applied to small substrates only. In the case of a silicon dioxide coating applied for electrical insulation, the thickness of the coating is generally required to be at least 5000 Å in many instances. However, the conventional vacuum deposition, sputtering or CVD technique is suffering from a slow coating formation velocity and is thus accompanied by another problem that the treatment cost becomes significantly high for the formation of a silicon dioxide coating of 5000 Å or thicker. Furthermore, such conventional techniques tend to develop non-uniformity in the thickness of coatings as the coatings become thicker, thereby imposing a limitation to the current trend toward larger substrates.

SUMMARY OF THE INVENTION

Accordingly, it is an object of the present invention to provide a method for making a silicon dioxide coating, which method is applicable to large glass substrates without need for expensive facilities.

It is another object of the present invention to make a rigid silicon dioxide coating.

It is still another object of the present invention to make a silicon dioxide coating having a desired thickness by subjecting a substrate to a treatment for a predetermined constant time period.

It is still another object of the present invention to make a silicon dioxide coating having a great thickness.

These and other objects have been attained by a method which makes a silicon dioxide coating on a surface of a substrate by dipping the substrate in a treatment liquid obtained by adding boric acid to an aqueous silicon dioxide-saturated solution of hydrosilicoflouric acid.

Other and further objects, features and advantages of the present invention will appear more fully from the following description.

DETAILED DESCRIPTION OF THE INVENTION

In the course of carrying out an investigation to develop a novel surface-coating method which is capable of overcoming the above-described drawbacks of the prior art methods, the present inventors have found that a uniform and low reflectance coating occurs on a surface of an alkali metal-containing glass sheet when the glass sheet is dipped in a treatment liquid obtained by adding boric acid to a 1.5 mol/l aqueous solution of hydrosilicoflouric acid, which aqueous solution is saturated with silicon dioxide, in an amount of $1.0 \times 10^{-2}$–$3.0 \times 10^{-2}$ mole per unit mole of $H_2SiF_6$.

The distribution of the composition of the coating was then analyzed in the depthwise direction from the surface thereof by means of X-ray photoelectric spectrum(XPS). Neither Na nor Ca was detected but only Si was detected to a certain depth, thereby confirming that the coating formed on the surface of the glass sheet was a silicon dioxide coating. In order to investigate the effect of the thus-formed silicon dioxide coating in preventing alkali metal component or components from eluting from the glass sheet, the glass substrate was heated to 250° C. and a voltage of 100 V was applied in the thickness direction of the glass substrate. In the case of an untreated glass substrate, a change was observed on the surface thereof after 2 hours. An analysis by XMA indicated that the change was caused by a sodium compound. On the other hand, a glass substrate treated in accordance with the method of this invention showed no change on the surface thereof even after an elapsed time of 10 hours. Thus, it was found that the silicon dioxide coating according to this method exhibited a great effect for the prevention of eluiton of alkali metal or metals.

The present invention has been completed on the basis of the above finding. According to the present invention, a silicon dioxide coating is formed on a surface of a substrate such as glass substrate by dipping the substrate in a treatment liquid obtained by adding boric acid to an aqueous silicon dioxide-saturated solution of hydrosilicofluoric acid.

The treatment method of the present invention is superior to conventional coating-making processes or techniques such as the vacuum deposition technique in that the former method can be applied to large glass substrates without need for expensive facilities.

It is the particularly important feature in the present invention to add boric acid to an aqueous silicon dioxide-saturated solution of hydrosilicofluoric acid. It has already been known to treat the surface of an alkali metal-containing glass sheet with a solution of hydrosilicofluoric acid. In this case, however, the glass sheet is corroded at a surface portion thereof by the solution of hydrosilicofluoric acid, thereby causing the alkali metal or metals to be eluted and, as a result, leaving a layer of silicon dioxide on the surface of the glass sheet. Accordingly, the thus-formed silicon dioxide layer is porous. Contrary to such a conventional method, the method of this invention forms a silicon dioxide coating by adding boric acid to an aqueous silicon dioxide-saturated solution of hydrosilicofluoric acid and then allowing the thus-supersaturated silicon dioxide to precipitate on the surface of a glass substrate. Hence, the method according to this invention is able to form a dense silicon dioxide coating.

Figure 1A:
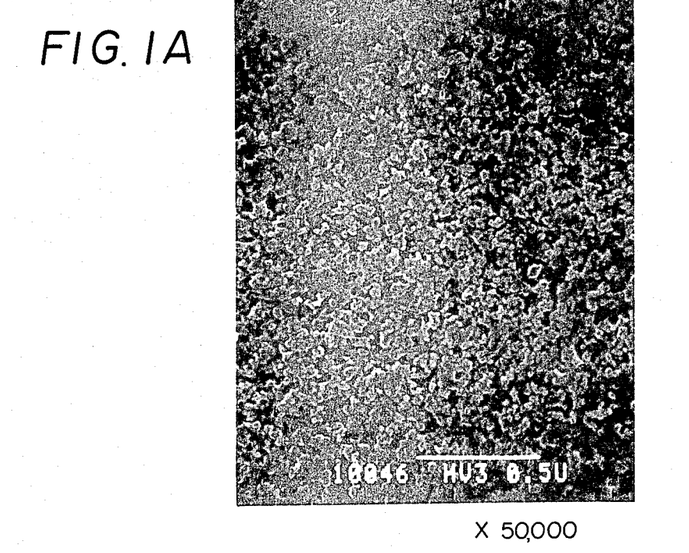
FIGS. 1A and 1B are electron micrographs of each of the surface of a silicon dioxide coating formed on a glass sheet.
Figure 1B:
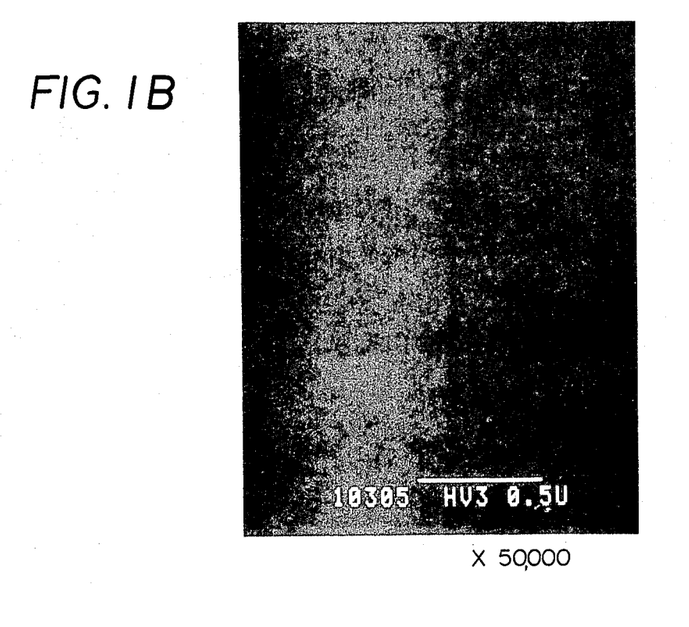

FIGS. 1A and 1B are electron micrographs of each of the surface of a silicon dioxide coating formed on a glass sheet. The instance shown in FIG. 1A was treated with a treatment liquid obtained by adding boric acid to an aqueous silicon dioxide-saturated solution of hydrosilicofluoric acid in amount of $0.33 \times 10^{-2}$ mole per unit mole of $H_2SiF_6$. The obtained silicon dioxide coating is relatively porous. This shows that the silicon dioxide coating was formed principally by corrosion. On the other hand, the instance shown in FIG. 1B was treated with a treatment liquid obtained by adding boric acid to an aqueous silicon dioxide-saturated solution of hydrosilicofluoric acid in amount of $1.5 \times 10^{-2}$ mole per unit mole of $H_2SiF_6$. The obtained silicon dioxide coating is very dense.

According to the present invention, it is possible to form a silicon dioxide coating of a desired thickness by varying the amount of boric acid to be incorporated and/or the treatment time. Furthermore, the formation velocity of the silicon dioxide coating varies when the concentration of hydrosilicofluoric acid in the treatment liquid and/or the treatment temperature are changed. Therefore, it is feasible to choose desired treatment conditions so that the coating is formed to a desired thickness. However, it takes too long time to achieve a desired thickness of the concentration of hydrosilicofluoric acid is too low. On the other hand, the surface of a resulting silicon dioxide coating becomes uneven if its concentration becomes excessively high. Accordingly, it is desired to make the concentration of hydrosilicofluoric acid within 0.5 to 3.0 mol/l, and more preferably 1-2.5 mol/l.

When preparing such an aqueous solution of hydrosilicofluoric acid, it is preferred, first of all, to saturate an aqueous solution containing hydrosilicofluoric acid at a concentration higher than a desired concentration with silicon dioxide and then to dilute the resulting solution with water so as to lower the concentration of hydrosilicofluoric acid to the desired concentration. The above preparation procedure is preferred because it permits to obtain a thick silicon dioxide coating efficiently with a fast coating formation velocity. Namely, the concentration of hydrosilicofluoric acid in the final aqueous solution, which is used as the treatment liquid, may preferably range from 0.5 mol/l to 3 mol/l. The formation velocity of a silicon dioxide coating becomes faster when using, instead of a treatment liquid formed by directly preparing an aqueous solution containing hydrosilicofluoric acid at a concentration in the above range and saturating the aqueous solution with silicon dioxide, a treatment liquid obtained by preparing in advance an aqueous solution containing hydrosilicofluoric acid at a higher concentration, saturating the aqueous solution with silicon dioxide and then diluting the thus-saturated aqueous solution with water so as to adjust the concentration of hydrosilicofluoric acid to 0.5–3 mol/l.

It is desirous to control the concentration of the boric acid within the range of $1.0 \times 10^{-2}$ to $3.0 \times 10^{-2}$ mole per unit mole of $H_2SiF_6$ because any concentrations lower than the lower limit do not allow silicon dioxide to precipitate on the surface of a substrate while any concentrations higher than the above upper limit result in occurrence of a precipitate of $SiO_2$ in the treatment liquid and make it difficult to form coatings having uniform surfaces. In order to form a less hazy silicon dioxide coating at a fast velocity, it is desired to adjust the concentration of boric acid to $1.2 \times 10^{-2} - 2 \times 10^{-2}$ mole per unit mole of $H_2SiF_6$.

In a preferred embodiment of this invention, a heat treatment is applied after dipping a substrate in a treatment liquid obtained by adding boric acid to an aqueous silicon dioxide-saturated solution of hydrosilicofluoric acid and forming a silicon dioxide coating on the substrate. The heat treatment converts the silicon dioxide coating formed on the surface of the substrate to a more rigid coating, whereby bringing about a still better effect with respect to the prevention of elution of alkali metal or metals.

It has not yet been fully elucidated why such a rigid silicon dioxide coating is formed on the substrate by the above method. It is however assumed that fluorine atoms of hydrosilicofluoric acid reacts with the added boric acid to form $SiO_2$ molecules, the $SiO_2$ molecules are then allowed to deposit on the surface of the substrate, and the heat treatment of the substrate causes mingled OH groups to undergo a dehydration reaction so as to form more $SiO_2$ bonds.

Although the properties of the silicon dioxide coating are improved as the temperature of the heat treatment goes up, the upper limit of the heat treatment temperature is generally about 550° C. or so in view of the heat resistance of a substrate where the substrate is a glass substrate. The lower limit of the heat treatment temperature may be suitably chosen in accordance with properties to be desired but may preferably be 300° C. or higher.

There is no special limitation to the heating time and 10–60 minutes are sufficient.

In another preferred embodiment of this invention, upon forming a silicon dioxide coating on a substrate by dipping the substrate in a treatment liquid obtained by adding boric acid to an aqueous silicon dioxide-saturated solution of hydrosilicofluoric acid, the capacity of the treatment liquid to make silicon dioxide coatings is restored substantially to the initial level by adding a predetermined amount of boric acid after forming the silicon dioxide coating. The formation of silicon dioxide coatings and addition of boric acid are alternately and repeatedly carried out so as to provide silicon dioxide coatings of the same thickness at the same velocity. The above procedure permits to obtain silicon dioxide coatings of the same thickness on substrates by carrying out the dipping treatments of the substrates for the same time period, even if the dipping treatments of the substrates are repeatedly and successively conducted. Therefore, the above method is particularly useful for making a coating having a uniform thickness of 1000 Å or greater which thickness is required for example to prevent alkali metal or metals from eluting from an alkali metal-containing glass substrate.

In the practice of the above method, boric acid is first of all added to an aqueous silicon dioxide-saturated solution, which contains 0.5–3.0 mol/l, or preferably 1–2.5 mol/l of hydrosilicofluoric acid, in an amount of $1.0 \times 10^{-2}$ mole–$3.0 \times 10^2$ mole per unit mole of $H_2SiF_6$, thereby forming an initial treatment liquid.

A substrate, for example, a glass article having a predetermined standard surface area such as glass sheet, glass pipe or the like is then subjected to a dipping treatment in the treatment liquid so as to form a silicon dioxide coating having a desired thickness, for example, of 1600 Å thick on the surface of the glass article. Thereafter, the glass article is pulled out of the treatment liquid.

Then, a glass sample having the same composition as the above-mentioned glass article is dipped in the treatment liquid. The thickness of resulting silicon dioxide coatings are measured respectively at various addition levels of boric acid by changing the amount of added boric acid little by little, for example, in the order of $0.7 \times 10^{-3}$ mole per unit mole of $H_2SiF_6$. The relationship between the thicknesses of silicon dioxide coatings and boric acid concentrations is thus determined.

The amount of boric acid added until the silicon dioxide coating has reached the above-mentioned desired thickness, for example, 1600 Å is to be chosen as an amount of boric acid to be added after treating each glass article of the standard total surface area. When the total surface area of a glass article to be treated is different from the above-mentioned standard surface area, the amount of boric acid required to add for the treatment of the glass article is determined by multiplying the above-mentioned standard amount with the ratio of the total surface area of the glass article to the standard surface area.

The mechanism of formation of the silicon dioxide coating in the above treatment method has not been fully elucidated. It is however assumed that an addition of boric acid to hydrosilicofluoric acid($H_2SiF_6$) promotes the decomposition of $H_2SiF_6$ into $SiO_2$ and $HBF_4$ and, as a result, $SiO_2$ is allowed to deposit on the surface of a dipped glass article.

In a further preferred embodiment of the present invention, a silicon dioxide coating having a thickness of 5000 Å or more is provided on the surface of a silicon dioxide-coated substrate by forming a relatively thin silicon dioxide coating having a thickness of 400 Å or more in advance on the surface of the substrate and then dipping the resultant silicon dioxide-coated substrate in a treatment liquid obtained by adding boric acid to an aqueous silicon dioxide-saturated solution of hydrosilicofluoric acid.

The conventionally-employed vacuum deposition, sputtering, CVD or dipping technique may be applied to form the thin silicon dioxide coating in advance on the surface of the substrate. It is not always necessary that the silicon dioxide coating is made of pure silicon dioxide. It may be a mixture of silicon dioxide and the oxide or oxides of Al, Ca, Na, K, Ti, Cu, Zn, Ba, Mg, Mn, Zr and/or the like. The above method is particularly useful when forming a thick electrically-insulative coating on the surface of a substrate. It may be applied to a substrate which is made of a material soluble in the aqueous silicon dioxide-saturated solution of hydrosilicofluoric acid or an organic material.

In a still further preferred embodiment of this invention, the present invention is applied to a continuous treatment process in which the treatment liquid is continuously pumped out at a constant rate from a substrate-dipping tank, the thus-pumped out treatment liquid is filtered continuously throuth a filter having apertures of 1.5 microns or smaller in diameter, and the thus-filtered treatment liquid is returned to the substrate-dipping tank. In the above treatment process, the proportion of the treatment liquid circulated per minute is at least 3% based on the whole treatment liquid and a necessary amount of boric acid is continuously charged and mixed as an aqueous solution to the treatment liquid. The above process permits to prevent the haze of a resulting coating from becoming severer and also to avoid occurrence of a precipitate in the treatment liquid owing to the circulation of the treatment liquid with a filtering step incorporated in the circulation step, even if the concentration of boric acid is increased, in other words, the formation velocity of a silicon dioxide coating is increased.

In the above process, it is necessary for the filter to have apertures of 1.5 microns or smaller in diameter. Any apertures bigger than 1.5 microns in diameter cannot bring about any sufficient filtering effect to achieve the desired extent of haze. In the above circulation-type continuous treatment step, it is effective to circulate the treatment liquid at a proportion of 3% or more per minute based on the whole treatment liquid. If this proportion is too small, it takes a longer time period until the whole treatment liquid is circulated. As a result, a precipitate of silicon dioxide occurs in the treatment liquid, whereby readily inducing the blocking of the filter. This makes the continuous treatment unable to proceed any longer. An addition of boric acid renders the aqueous silicon dioxide-saturated solution of hydrosilicofluoric acid supersaturated with silicon dioxide. Accordingly, a precipitate of silicon dioxide occurs in the treatment liquid when the treatment liquid is allowed to stand for a long period of time. Therefore, it is necessary to filter the treatment liquid at a suitable interval.

In the substrate-dipping tank, it is necessary that the treatment liquid flows as a laminar flow parallel to the surface of the substrate. Turbulent flow is not preferred because it results in the formation of a silicon dioxide coating having uneven thickness. It is not preferred if the flow velocity of the treatment liquid is too fast relative to the surface of the substrate, because such an excessively fast flow velocity lowers the coating formation velocity.

When a glass sheet having a metal or metal oxide coating applied thereon is desired, it may be possible to deposit the metal or metal oxide coating on a silicon dioxide coating formed on the glass sheet in accordance with the present invention. By doing so, it is possible to prevent one or more alkali metals contained in the glass sheet from moving into the metal or metal oxide coating and contaminating the metal or metal oxide coating even if the glass substrate is a silicate glass substrate which contains one or more alkali metals.

In the above embodiment, the metal or metal oxide coating applied on the silicate glass substrate may generally be a coating of a metal such as gold, silver, nickel, copper, aluminum or the like or a metal oxide such as tin oxide, indium oxide, cadmium oxide or the like. The thickness of the silicon dioxide coating deposited on the silicate glass substrate may preferably be from 500 Å to 2500 Å or so. This thickness is effective to avoid occurrence of cracks in the silicon dioxide coating and is able to overcome the deleterious effect of alkali metal or metals present in the silicate glass substrate.

The present invention will be more clearly understood with reference to the following Examples.

EXAMPLE 1

A glass sheet having a composition of 72.8 wt.% $SiO_2$, 1.76 wt.% $Al_2O_3$, 4.03 wt.% MgO, 7.27 wt.% CaO, 13.1 wt.% $Na_2O$ and 0.79 wt.% $K_2O$ was immersed for 10 minutes in 0.5% HF in order to remove dirt, stain and the like from the surface of the glass sheet. After washing the thus-cleaned glass sheet with water, it was dipped at 35° C. and for 360 minutes in an aqueous silicon dioxide-saturated solution containing 0.5 mol/l of hydrosilicofluoric acid, to which solution boric acid had been added at a proportion of $1.7 \times 10^{-2}$ mole per unit mole of $H_2SiF_6$. As a result, a silicon dioxide coating of about 400 Å thick was formed on the surface of the glass sheet.

EXAMPLE 2

A glass sheet having a composition of 73.2 wt.% $SiO_2$, 1.90 wt.% $Al_2O_3$, 1.12 wt.% MgO, 8.67 wt.% CaO, 14.3 wt.% $Na_2O$ and 0.06 wt.% $K_2O$ was immersed for 10 minutes in 0.5% HF in order to remove dirt, stain and the like from the surface of the glass sheet. After washing the thus-cleaned glass sheet with water, it was dipped at 35° C. and for 300 minutes in an aqueous silicon dioxide-saturated solution containing 1.5 mol/l of hydrosilicofluoric acid, to which solution boric acid had been added at a proportion of $1.9 \times 10^{-2}$ mole per unit mole of $H_2SiF_6$. As a result, a silicon dioxide coating of 600 Å thick was formed.

EXAMPLE 3

A glass sheet having a composition of 73.2 wt.% $SiO_2$, 1.90 wt.% $Al_2O_3$, 0.12 wt.% MgO, 8.67 wt.% CaO, 14.3 wt.% $Na_2O$ and 0.06 wt.% $K_2O$ was immersed for 10 minutes in 0.5% HF in order to remove dirt, stain and the like from the surface of the glass sheet. After washing the thus-cleaned glass sheet with water, it was dipped at 35° C. and for 240 minutes in an aqueous silicon dioxide-saturated solution containing 1.5 mol/l of hydrosilicofluoric acid, to which solution boric acid had been added at a proportion of $2.1 \times 10^{-2}$ mole per unit mole of $H_2SiF_6$. As a result, a silicon dioxide coating of 800 Å was formed.

EXAMPLE 4

Aqueous solutions containing hydrosilicofluoric acid respectively at concentrations of 1.0, 1.5, 2.0 and 3.0 mol/l as shown in Table 1 were prepared prior to saturating them with silicon dioxide. Each of the aqueous solution was then saturated with silicon dioxide. The resultant solutions were respectively diluted with water to adjust the concentrations of hydrosilicofluoric acid to the figures given in Table 1. Each of the thus-formed aqueous silicon dioxide-saturated solution was then added and mixed with a 0.5 mol/l aqueous solution of boric acid until $1.4 \times 10^{-2}$ mole of boric acid is contained per mole of silicon dioxide. Accordingly, four types of treatment liquids were prepared. Soda-lime glass sheets were dipped respectively in the four types of treatment liquids for 20 hours. Thereafter, the glass sheets were observed to determine whether silicon dioxide coatings had been formed thereon or not.

Results are shown in Table 1. The formation velocity of a silicon dioxide coating was accelerated and a coating thickness of 500 Å or thicker was achieved efficiently by saturating an aqueous solution containing hydrosilicofluoric acid at a high concentration with silicon dioxide, diluting the resultant solution with water to lower the concentration of hydrosilicofluoric acid to the desired value and then using the thus-prepared aqueous silicon dioxide-saturated solution of hydrosilicofluoric acid as a treatment liquid.

TABLE 1

Treatment Results at Varied Concentrations

| $H_2SiF_6$ concentration prior to saturation with $SiO_2$ | $H_2SiF_6$ concentration after diluted with water | Observation results of $SiO_2$ coating after dipped for 20 hours | |
|---|---|---|---|
| | | Thickness (Å) | Haze (%) |
| 1.0 (mol/l) | 1.0 (undiluted) | 850 | 0.20 |
| 1.5 | 1.0 | 2110 | 0.25 |
| | 1.5 (undiluted) | 1350 | 0.22 |
| 2.0 | 1.0 | 7250 | 0.42 |
| | 1.5 | 6210 | 0.31 |
| | 2.0 (undiluted) | 3640 | 0.30 |
| 3.0 | 2.0 | 19330 | 0.58 |
| | 2.5 | 13300 | 0.50 |
| | 3.0 (undiluted) | 6250 | 0.35 |

EXAMPLE 5

Square glass sheets each of 10 cm by 10 cm and 1 mm thick and having a composition of 72.8 wt.% $SiO_2$, 1.76 wt.% $Al_2O_3$, 4.03 wt.% MgO, 7.27 wt.% CaO, 13.1 wt.% $Na_2O$ and 0.79 wt.% $K_2O$ were immersed for 10 minutes in 0.5% HF solution in order to remove dirt, stain and the like from the surface of the glass sheet. The thus-cleaned glass sheet were then washed with water. Thereafter, they were dipped at 35° C. and for 840 minutes in an aqueous silicon dioxide-saturated solution containing 1.5 mol/l of hydrosilicofluoric acid, to which boric acid had been added at a proportion of $1.7 \times 10^{-2}$ mole per unit mole of $H_2SiF_6$. As a result, a silicon dioxide coating of about 1200 Å thick was formed on the surface of each of the glass sheets.

One of the glass sheets was then subjected to a heat treatment at 350° C. and for 30 minutes. The glass sheet will be designated as Sample A. The other glass sheet was heat-treated at 500° C. and for 30 minutes. It will be designated as Sample B. Both samples were immersed in a mixed etching solution consisting of 22.5 g of 55% fluoric acid, 900 cc of water and 15 g of 60% nitric acid and maintained at 22° C. Depths of corrosions in the silicon dioxide coatings were measured. As a result, the corrosion depth of the silicon dioxide coating of Sample A was 650 Å while that of the silicon dioxide coating of Sample B was 350 Å, both upon an elapsed time of 3 minutes after initiation of the immersion.

As a comparative example, a sample which had not been subjected to any heat treatment was immersed for 3 minutes in the above etching solution. The silicon dioxide coating was corroded to a depth of 1100 Å.

From the above results, it has been confirmed that a heat treatment can provide a corrosion-resistant, excellent and rigid silicon dioxide coating.

EXAMPLE 6

Following the procedure of Example 5, square glass sheets each of 10 cm by 10 cm and 1 mm thick were dipped at 35° C. and for 840 minutes in an aqueous silicon dioxide-saturated solution of hydrosilicofluoric acid, to which boric acid had been added, thereby forming a silicon dioxide coating of about 1200 Å thick on the surface of each glass sheet. The thus-obtained samples were heat-treated for 30 minutes and respectively at 200° C., 300° C., 400° C., 500° C. and 550° C. After completion of the heat treatment, the samples were cooled to room temperature and, subsequent to washing and drying the surfaces of the silicon dioxide coatings, conductive films of Sn-doped indium were applied respectively on the surfaces of the silicon dioxide coatings by the sputtering technique so as to form comb-shaped electrodes in which each two adjacent electrodes are separated with a distance of 140 μm. A voltage was applied between the electrodes to investigate the electrically insulative property of each silicon dioxide coating.

The applied voltage was a.c. 5 V and the frequency was 2 KHz. In order to accelerate the performance test, all the samples were heat-treated at 500° C. and for 30 minutes and the surface resistances of the silicon dioxide coatings were measured in an atmosphere of 90% R.H. Measurement results are shown in Table 2.

From the results shown in Table 2, it is apparent that the electrically insulative property of a silicon dioxide coating is improved to a significant extent by a heat treatment.

TABLE 2

| Heat treatment conditions | Surface resistance (MΩ) |
| --- | --- |
| No heat treatment | 1.8 |
| 200° C., 30 minutes | 5 |
| 300° C., 30 minutes | 15 |
| 400° C., 30 minutes | 26 |
| 500° C., 30 minutes | 58 |
| 550° C., 30 minutes | 22 |

EXAMPLE 7

A glass sheet having a composition of 72.8 wt.% $SiO_2$, 1.76 wt.% $Al_2O_3$, 4.03 wt.% MgO, 7.27 wt.% CaO, 13.1 wt.% $Na_2O$ and 0.79 wt.% $K_2O$ was immersed for 10 minutes in 0.5% HF in order to remove dirt, stain and the like from the surface of the glass sheet. After washing the thus-cleaned glass sheet with water, it was dipped at 35° C. and for 24 hours in an aqueous silicon dioxide-saturated solution containing 1.5 mol/l of hydrosilicofluoric acid, to which solution boric acid had been added at a proportion of $1.7 \times 10^{-2}$ mole per unit mole of $H_2SiF_6$. As a result, a silicon dioxide coating of about 1600 Å thick was fomed on the surface of the glass sheet.

Six types of treatment liquids were prepared by adding boric acid as a 0.5 mol/l aqueous solution to the above treatment liquid to various concentrations different from one another by $0.7 \times 10^{-3}$ mole from $0.7 \times 10^{-3}$ mole to $4.2 \times 10^{-3}$ mole per unit mole of $H_2SiF_6$. Glass sheet samples having the same composition and size as the above glass sheet were dipped for 24 hours respectively in the six types of treatment liquids. The treatment liquid added with $1.4 \times 10^{-3}$ mole of boric acid per unit mole of $H_2SiF_6$ gave a silicon dioxide coating of about 1600 Å, It was found that boric acid concentrations lower than $1.4 \times 10^{-3}$ mole per unit mole of $H_2SiF_6$ resulted in thinner silicon dioxide coatings while boric acid concentrations higher than $1.4 \times 10^{-3}$ mole per unit mole of $H_2SiF_6$ gave silicon dioxide coatings having greater thicknesses than about 1600 Å. Thus, the formation of a silicon dioxide coating was conducted continuously using the treatment liquid containing $1.4 \times 10^{-3}$ mole of boric acid per unit mole of $Hi_2SiF_6$. By repeating the same procedure, a number of glass sheets each provided with a silicon dioxide coating of about 1600 Å thick was prepared with the same coating thickness and treatment time period in each run.

EXAMPLE 8

A glass sheet having a composition of 73.2 wt.% $SiO_2$, 1.90 wt.% $Al_2O_3$, 0.12 wt.% MgO, 8.67 wt.% CaO, 14.3 wt.% $Na_2O$ and 0.06 wt.% $K_2O$ was immersed for 10 minutes in 0.5% HF. After washing the thus-cleaned glass sheet with water, it was dipped at 35° C. and for 20 hours in an aqueous silicon dioxide-saturated solution containing 1.5 mol/l of hydrosilicofluoric acid, to which solution boric acid had been added at a proportion of $1.9 \times 10^{-2}$ mole per unit mole of $H_2SiF_6$. As a result, a silicon dioxide coating of about 2400 Å was formed on the surface of the glass sheet. Boric acid was added at proportions of $0.7 \times 10^{-3}$ mole to $4.2 \times 10^{-3}$ mole per unit mole of $H_2SiF_6$ respectively to portions of the above treatment liquid in the same manner as in Example 7. Glass sheets, which had been pretreated in the same manner as in the above, were dipped for 20 hours respectively in the thus-formed treatment liquids. The treatment liquid added with $2.1 \times 10^{-3}$ mole of boric acid per unit mole of $H_2SiF_6$ gave a silicon dioxide coating of about 2400 Å thick. The treatment liquids added at proportions lower than the above concentration with boric acid provided thinner silicon dioxide coatings while those added at proportions higher than the above concentration with boric acid gave thicker silicon dioxide coatings.

Thereafter, $2.1 \times 10^{-3}$ mole of boric acid per unit mole of $H_2SiF_6$ was added to the treatment liquid to which boric acid had been added at a proportion of $2.1 \times 10^{-3}$ mole per unit mole of $H_2SiF_6$, whenever the treatment of each glass sheet had been completed in the treatment liquid. The addition of boric acid and treatment of glass sheet were repeated, thereby forming silicon dioxide coatings having a constant thickness of about 2400 Å with substantially the same treatment time.

EXAMPLE 9

Twelve types of substrates, which are given in Table 3, were provided. The $SiO_2$ and $SiO_2.P_2O_5$ undercoatings were applied by the sputtering technique. On the other hand, the $Na_2O.SiO_2$ and $SiO_2.TiO_2$ undercoatings were applied by the conventional dipping technique. In Sample No. 10, "$SiO_2.Na_2O/SnO_2$" means that an $SiO_2.Na_2O$ coating was applied on an $SnO_2$-coated glass substrate. In Sample No. 11, $SiO_2.P_2O_5$ was coated on an $In_2O_3$-coated glass substrate. In Sample No. 12, an $SiO_2.TiO_2$ coating was applied on a glass substrate. The thicknesses of these undercoatings were adjusted approximately to 1000 Å. The thus-prepared substrates were dipped for 20 hours in a mixed solution (treatment liquid) consisting of an aqueous silicon dioxide-saturated solution of hydrosilicofluoric acid and boric acid. Thereafter, the substrates were observed to determine whether silicon dioxide coatings had been formed or not. Here, the preparation of the treatment liquid was effected by diluting a 2 mol/l aqueous solution of hydrosilicofluoric acid, which had been saturated with silicon dioxide, with water to lower the concentration of hydrosilicofluoric acid to 1.5 mol/l and then by adding and mixing a 0.5 mol/l aqueous solution of boric acid with the thus-diluted aqueous solution in such an amount that $1.4 \times 10^{-2}$ mole of boric acid is contained per mole of hydrosilicofluoric acid.

The temperature of the treatment liquid was maintained at 35° C. while the substrate were dipped therein.

Results are summarized in Table 3. It is appreciated that lowly-hazed silicon dioxide coatings each having a thickness of 5000 Å or greater were formed on the surfaces of the substrates.

TABLE 3

Treatment Results of Various Substrates

| Substrate | Technique employed to precoat with silicon dioxide | Results after dipped for 20 hours in treatment liquid | Haze (%) |
|---|---|---|---|
| 1. Ni-coated glass substrate | — | Ni-coating, peeled off | — |
| 2. In$_2$O$_3$-coated glass substrate | — | In$_2$O$_3$, dissolved and lost | — |
| 3. SnO$_2$-coated glass substrate | — | Discontinuous coating with many pinholes | — |
| 4. TiO$_2$-coated glass substrate | — | Unchanged | — |
| 5. Polycarbonate substrate | — | Unchanged | — |
| 6. Glass substrate coated with SiO$_2$ and Ni coatings | sputtering | SiO$_2$ coating of 6350 Å | 0.44 |
| 7. Glass substrate coated with SiO$_2$ and In$_2$O$_3$ coatings | sputtering | SiO$_2$ coating of 6210 Å | 0.31 |
| 8. Glass substrate coated with SiO$_2$ and SnO$_2$ coatings | sputtering | SiO$_2$ coating of 5990 Å | 0.35 |
| 9. Polycarbonate substrate coated with SiO$_2$ coating | sputtering | SiO$_2$ coating of 6030 Å | 0.38 |
| 10. SiO$_2$.Na$_2$O/SnO$_2$ | dipping | SiO$_2$ coating of 6410 Å | 0.29 |
| 11. SiO$_2$.P$_2$O$_5$/In$_2$O$_3$ | sputtering | SiO$_2$ coating of 6050 Å | 0.42 |
| 12. SiO$_2$.TiO$_2$/glass | dipping | SiO$_2$ coating of 5980 Å | 0.33 |

EXAMPLE 10

On the surfaces of ITO-coated glass substrates, SiO$_2$ coatings were applied respectively to thicknesses of 200 Å, 400 Å, 600 Å and 800 Å by the sputtering technique. Thereafter, these substrates were dipped for 20 hours in a treatment liquid. The treatment liquid was prepared in the same manner as in Example 9. After dipping, the substrates were observed to determine whether silicon dioxide coatings had been formed or not. Observation results are shown in Table 4. From this table, it is understood that a silicon dioxide coating of a low haze and 5000 Å or thicker can be obtained by precoating the surface of a substrate with a silicon dioxide coating of at least 400 Å thick.

TABLE 4

Thickness of SiO$_2$ Coating Required in Advance

| | Thickness of SiO$_2$ coating | | | |
|---|---|---|---|---|
| | 200 Å | 400 Å | 600 Å | 800 Å |
| SiO$_2$ coating on the ITO coating | ITO eluted, SiO$_2$ coating formed on glass | SiO$_2$ coating of 6320 Å | SiO$_2$ coating of 6150 Å | SiO$_2$ coating of 6200 Å |
| Haze (%) | — | 0.31 | 0.33 | 0.30 |

EXAMPLE 11

A soda-line glass sheet of 100 mm × 100 mm wide and 1 mm thick was immersed for 10 minutes in a 0.5 wt.% solution of HF. Thereafter, the glass sheet was thoroughly washed and dried. Then, the glass sheet was dipped in a dipping tank shown in FIG. 2. The dipping tank is formed of an outer tank 1 and inner tank 2 and water 3 is filled up between the inner and outer tanks. In the present experiment, the water was heated by a heater 4 so as to maintain its temperature at 35° C. It was also agitated by a stirrer 5 to ensure the uniformity of the temperature distribution. The inner tank consists of a front compartment 6, middle compartment 7 and rear compartment 8. Each of the compartments was filled up with a treatment liquid which consisted of an aqueous silicon dioxide-saturated solution containing 2.0 mol/l of hydrosilicofluoric acid and a 0.5 mol/l aqueous solution of boric acid at a volume ratio of 25:1.

Figure 2:
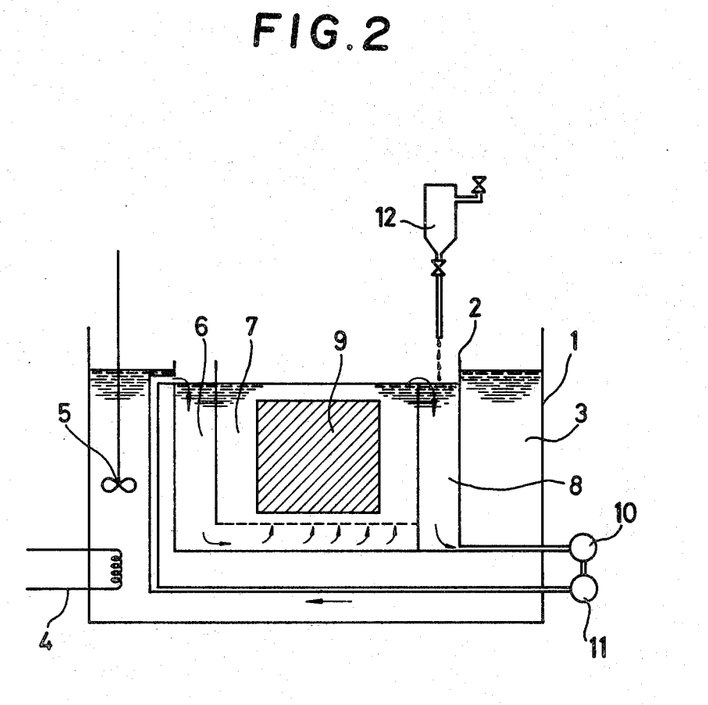
FIG. 2 is a semi-diagrammatical vertical sectional view of a treatment liquid circulation apparatus according to one preferred embodiment of this invention.

The above-mentioned HF-treated glass sheet 9 is dipped and held upright in the middle compartment 7 of the inner tank 2. The treatment liquid in the rear compartment 8 of the inner tank 2 was pumped out at a constant rate and returned through a filter 11 into the front compartment 6 of the inner tank 2 by means of a circulation pump 10. In this circulation system, the total volume of the treatment liquid was 3 liters. A 0.5 mol/l aqueous solution 12 of boric acid was continuously added dropwise at a rate of 0.1 ml/min into the rear compartment 8 of the inner tank 2.

Under the above conditions, an experiment was carried out by changing the aperture size of the filter to 0.6 μm, 1.2 μm, and 1.5 μm and 2.5 μm and by taking out the filter (i.e., the conventional method) respectively while varying the volume of the circulated treatment liquid to 60, 90, 120 and 240 ml/min respectively for each filter. The formation velocities and haze (%) of the thus-obtained silicon dioxide coatings were compared. By the way, the haze(%) were measured and compared by adjusting the thicknesses of the silicon dioxide coatings to 1400 Å.

Results are summarized in Tables 5 and 6. It is appreciated that the haze(%) can be controlled below 0.5% when a filter having an aperture size of 1.5 microns or smaller is used and the treatment liquid is circulated at a rate of at least 90 ml/min, in other words, at rate of at least 3% per minute based on the whole treatment liquid.

TABLE 5

| Volume of treatment liquid circulated (ml/min.) | Percentage of treatment liquid circulated per minute relative to the whole treatment liquid | Formation Velocity of Silicon Dioxide Coating (Å/hour) |||||
|---|---|---|---|---|---|---|
| | | Filter (μm) |||||
| | | Not used | 0.6 | 1.2 | 1.5 | 2.5 |
| 60 | 2 | 392 | 400 | 402 | 398 | 395 |
| 90 | 3 | 347 | 350 | 345 | 351 | 353 |
| 120 | 4 | 288 | 290 | 290 | 285 | 294 |
| 240 | 8 | 252 | 246 | 247 | 250 | 251 |

TABLE 6

| Volume of treatment liquid circulated (ml/min.) | Percentage of treatment liquid circulated per minute relative to the whole treatment liquid | Haze (%) of Silicon Dioxide Coating |||||
|---|---|---|---|---|---|---|
| | | Filter (μm) |||||
| | | Not used | 0.6 | 1.2 | 1.5 | 2.5 |
| 60 | 2 | 2.11 | 0.51 | 0.59 | 0.75 | 1.14 |
| 90 | 3 | 1.46 | 0.33 | 0.37 | 0.40 | 0.88 |
| 120 | 4 | 1.20 | 0.19 | 0.25 | 0.29 | 0.76 |
| 240 | 8 | 1.02 | 0.15 | 0.21 | 0.24 | 0.57 |

EXAMPLE 12

Two soda-lime-silicate glass sheets of the sheet glass composition were immersed for 10 minutes in a 0.5 wt.% aqueous solution of HF and the thus-cleaned glass sheet were washed with water. Accordingly, two glass sheets 21 whose surfaces had been cleaned were provided (see, FIGS. 3 and 4).

Figure 3:
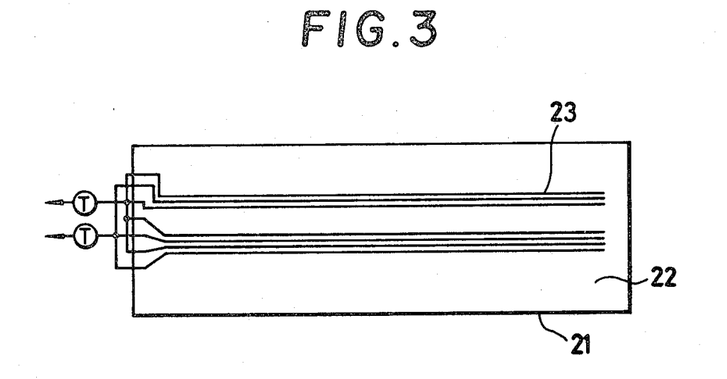
FIG. 3 is a plan view of a glass substrate in which a metal oxide coating has been formed on a silicon dioxide coating, and the plan view also contains a connection diagram of comb-shaped electrodes.
Figure 4:
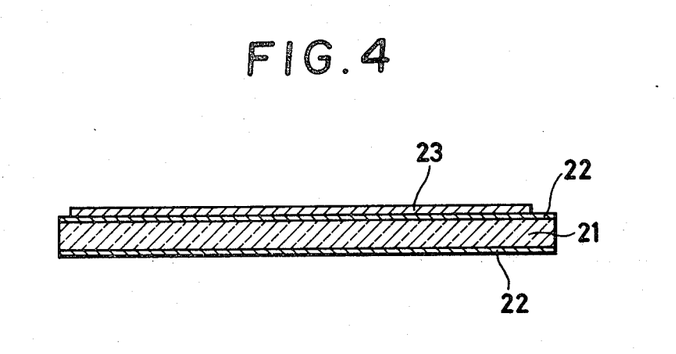
FIG. 4 is a vertical sectional view of the glass substrate of FIG. 3.

On the other hand, there was also provided a treatment liquid by adding boric acid to an aqueous silicon dioxide-saturated solution, which contained 1.5 mol/l of hydrosilicofluoric acid, at a proportion of $1.5 \times 10^{-2}$ mole per unit mole of $H_2SiF_6$. The treatment liquid was heated to 35° C., in which the above-mentioned two glass sheets 21 were dipped respectively for 5 hours and 10 hours, thereby forming silicon dioxide coatings 22 of 800 Å and 1600 Å respectively on the surfaces of the glass sheets 21. After firing the two glass sheets bearing the silicon dioxide coatings 22 thereon at 500° C. and for 30 minutes, tin-doped indium oxide coatings were respectively formed on the silicon dioxide coatings 22 by the sputtering technique. These indium oxide coatings were formed respectively into comb-shaped electrodes 23, which are illustrated in FIG. 3, by the photolithographic technique. They were then fired at 400° C. and for 30 minutes respectively, thereby obtaining Samples A and B.

After applying an alcohol solution of a reaction product between an organocarboxylic acid and tetrahalogenosilane on a glass sheet similar to the glass sheets 21 employed above, the glass sheet was heated to form a silicon dioxide coating of 1200 Å thick on the surface of the glass sheet. Thereafter, a comb-shaped electrode consisting of a tin-doped indium oxide coating was applied on the silicon dioxide coating in the same manner as that employed for the preparation of Samples A and B, thereby obtaining Comparative Sample C.

To investigate the readiness of movement of alkali metal or metals, notably, sodium from the glass substrates of Samples A and B and Comparative Sample C, a sinusoidal wave of 2 KHz and 5 V was applied between comb-shaped electrodes of each of the samples in an atmosphere of 90% R.H. (relative humidity) and the leakage resistance due to ionic conduction was measured. The leakage resistances of Samples A and B were respectively 15 MΩ and 30 MΩ, whereas that of Comparative Sample C was 4 MΩ. Namely, it is readily appreciated that Samples A and B were able to suppress the movement of the alkali metal from the glass substrates 21 more effectively than Comparative Sample C.

What is claimed is:

1. A method for making a silicon dioxide coating on a surface of a substrate, which method comprises dipping the substrate in a treatment liquid obtained by adding boric acid to an aqueous silicon dioxide-saturated solution of hydrosilicofluoric acid.

2. A method as claimed in claim 1, wherein the concentration of hydrosilicofluoric acid ranges from 0.5 mol/l to 3.0 mol/l.

3. A method as claimed in claim 2, wherein, upon preparation of the aqueous solution of hydrosilicofluoric acid, silicon dioxide is first of all saturated in an aqueous solution containing hydrosilicofluoric acid at a concentration higher than the desired value and the silicon dioxide-saturated aqueous solution is then diluted with water so as to lower the concentration of hydrosilicofluoric acid to its desired value.

4. A method as claimed in any one of claims 1 to 3, wherein boric acid is added in an amount of $1.0 \times 10^{-2}$ to $3.0 \times 10^{-2}$ mole per unit mole of $H_2SiF_6$.

5. A method as claimed in any one of claims 1 to 4, wherein, after making the silicon dioxide coating by dipping the substrate in the treatment liquid, the substrate is subjected to a heat treatment.

6. A method as claimed in claim 5, wherein the heat treatment is effected at 300° to 550° C.

7. A method as claimed in any one of claims 1 to 6, wherein, after making the silicon dioxide coating by dipping the substrate in the treatment liquid, boric acid is added to the treatment liquid so as to repeatedly use the treatment liquid while maintaining the silicon dioxide making capacity of the treatment liquid at a constant level.

8. A method as claimed in any one of claims 1 to 7, wherein a relatively thin silicon dioxide coating of at least 400 Å is made in advance on the surface of the substrate and the resulting silicon dioxide-coated substrate is dipped in the treatment liquid obtained by adding boric acid to the aqueous silicon dioxide-saturated solution of hydrosilicofluoric acid, thereby making a thick silicon dioxide coating of at least 5000 Å on the surface of the silicon dioxide-coated substrate.

9. A method as claimed in claim 8, wherein the relatively thin silicon dioxide coating made in advance on the surface of the substrate is made of a mixture of silicon dioxide and another material.

10. A method as claimed in claim 8 or 9, wherein the surface of the substrate is coated in advance with the relatively thin silicon dioxide coating by the vacuum deposition, sputtering, CVD or conventionally-known dipping technique.

11. A method as claimed in any one of claims 1 to 10, wherein the dipping treatment step is a continuous treatment step comprising, after pumping out the treatment liquid continuously at a constant rate from a substrate-dipping tank, continuously filtering the thus-pumped out treatment liquid through a filter having apertures of 1.5 microns or smaller in diameter and returning the thus-filtered treatment liquid to the substrate-dipping tank; and, in the continuous treatment step, the percentage of the amount of the treatment liquid circulated per minute relative to the whole treatment liquid is a least 3% and a necessary amount of boric acid is continuously charged and mixed as an aqueous solution in the treatment liquid.

12. A method as claimed in claim 11, wherein the treatment liquid flows as a laminar flow parallel to the surface of the substrate through the substrate-dipping tank.

* * * * *